June 9, 1936.  R. H. TURNER  2,043,955
METHOD OF MAKING MATRICES
Filed July 29, 1933
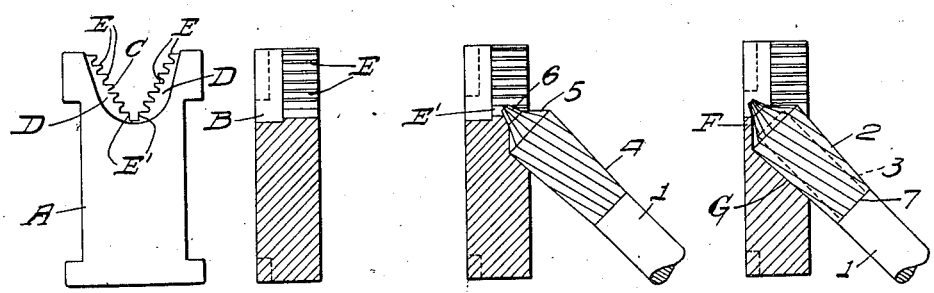
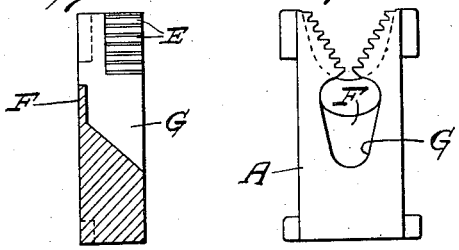
INVENTOR
Ransom H. Turner
BY
ATTORNEY Patented June 9, 1936

2,043,955

UNITED STATES PATENT OFFICE 2,043,955

METHOD OF MAKING MATRICES

Ransom H. Turner, Little Neck, N. Y., assignor to Intertype Corporation, Brooklyn, N. Y., a corporation of New York Application July 29, 1933, Serial No. 682,861

7 Claims. (Cl. 199—64)

The present invention relates to the manufacture of matrices for typographical machines of the class which circulate through the machine and which, after removal from the casting position, are distributed to the appropriate channels of the magazine from which they were drawn, by a ribbed combination rail on to which they are lifted and from which they are suspended while traveling therealong, by combination teeth formed on webs located in V-shaped notches in the matrices.

Heretofore, the combination teeth on matrices for machines of this class have been formed by punching them in matrices with relatively thin tooth carrying webs or by the use of a broach or like tool in matrices having relatively thick tooth carrying webs for the purpose of providing teeth of extended lengths in the direction of the thickness of the matrices. In forming teeth of such extended length by the use of a broach, it has not been practical to have the lowermost teeth of the web of the same extended length as the teeth formed in the upper portions of the web, because the lowermost teeth which lie closely opposite to one another at the bottom or apex of the V-shaped tooth carrying web require that the lowermost tooth cutting rib on the broach be made so weak that it will break easily when forced into the solid body of metal at the bottom of the web to cut the lowermost teeth. Consequently, it has not been possible heretofore to make the lowermost teeth on matrices of the same extended length as the upper teeth thereof, and hence the benefits of teeth of extended length for matrices having only the lowermost teeth for their distributing combination have not been obtained. This will be clear by reference to U. S. Patent No. 1,328,146, granted January 13, 1920, wherein, in order to broach teeth of an extended length, the thickness of the tooth carrying web toward the apex or bottom thereof is reduced so that the teeth toward the bottom of the web are of relatively short extent or length as compared with the rest of the teeth.

The present invention provides a novel method of forming the lowermost teeth on matrices whereby these teeth can be made to extend through the full thickness of the web, and the invention further facilitates the making of matrices in other respects, as will hereinafter appear, and more particularly, it enables the formation of the lowermost teeth and of the required distributor bar point stop at the side of the matrix opposite to the teeth, to be accomplished with facility and preferably in a single operation.

The manufacture of matrices in accordance with the present invention is thereby facilitated and rendered less costly, and the matrices thus produced will have all of their teeth of the same length, they preferably extending at least half way across the matrix in the direction of its thickness. The invention is particularly applicable to relatively thick matrices bearing large head letter or display characters, and since the teeth on matrices for machines of the class referred to begin at one side of the matrix, it is desirable that these teeth extend at least half way across the thickness of the matrix in order to support it vertically and provide sufficient carrying surface to support its weight without excessive wear of the teeth while traveling along the combination rail of the distributing mechanism.

In the accompanying drawing:—

Figure 1 is a side elevation of a matrix having six pairs of its teeth cut and finished while the seventh or lowermost pair of teeth and the recess to form the distributor bar point stop remain to be cut;

Figure 2 is a central vertical section through the matrix shown in Figure 1;

Figure 3 is a central vertical section through the matrix, illustrating the commencement of a cutting operation which cuts both the recess for the distributor bar point stop and also the lower surfaces of the lowermost pair of teeth;

Figure 4 is a view similar to Figure 3 but illustrating the substantial completion or termination of the cutting operation;

Figure 5 is a central vertical section through a finished matrix made according to the present invention; and Figure 6 is an elevation of the matrix as viewed from the right in Figure 5.

In carrying out the present invention, each matrix will be previously formed to the extent shown in Figures 1 and 2, the matrix A being made of brass or other suitable metal in the usual rectangular form with the usual lugs or ears on the corners thereof and formed in its upper end with the usual yoke-shaped recess B and V-shaped notch C, the latter containing a web D having the pairs of teeth E on the opposite walls of the web, with the exception of the lowermost pair of teeth E', formed in the ordinary manner by broaching.

Also, in carrying out the invention, a rotary cutting tool 1 is employed, this tool comprising for convenience an outer shell 2 and a core 3 removably or exchangeably fitted therein. The shell 2 is formed with a plurality of cutting edges on its side wall 4, and the end 5 of the shell is conical and provided with a plurality of cutting edges, the apex of this conical end of the shell being removed and forming an axial opening to the interior of the shell. The core 3 has a conical end 6 having cutting edges thereon, this end of the core extending through the central opening in the end 5 of the shell so that it lies substantially at the apex of the end face 5 thereof, the core having a shoulder 7 thereon which fits against the shell.

In performing the method with the aid of a tool constructed as described, a matrix, formed to the extent shown in Figures 1 and 2 is suitably held and the tool is fed into the matrix body from the side thereof at which the teeth E are located and in a direction parallel to said teeth or perpendicular to the plane of the matrix body while the tool is disposed with its axis inclined at a suitable angle with respect to the plane of the matrix, as shown in Figure 3, the tool being rotated while being so fed into the matrix body, so that the cutting edges 5 and 6 on the shell 2 and core 3 will act respectively to remove metal from the matrix body and from beneath the undersides of the lowermost pair of teeth E' while, at the same time, the cutting edges 4 on the side of the shell will act to further remove metal from the body of the matrix. The tool will be fed into the matrix body a distance sufficient to leave a vertical wall F on the side of the matrix opposite to that side at which the teeth are located and to form the recess G in the side of the matrix at which the teeth are located, as shown in Figure 4, and the finished matrix will have the form shown in section in Figure 5 and in elevation in Figure 6.

From the foregoing, it will be seen that the tool will, by the single operation described, produce a matrix having the necessary vertical wall F for the distributor bar point or separating stop in the machine and a recess G in its side face through which the distributor bar point or stop device can pass, and the matrix will be provided with a full set of teeth of extended length, including the lowermost pair of teeth E'. The problem of forming the lowermost teeth E' to an extended length is therefore solved efficiently and in a novel manner, and the difficulties heretofore experienced in broaching the teeth which lie close together are overcome.

According to the invention as shown and described, by forming the cutting edges 5 in a cone having its sides at an angle of 45° to the axis of the tool and feeding the tool into the matrix body by movement at an angle perpendicular to the plane of the matrix body while the axis of the tool is disposed at an angle of 45° to the plane of the matrix, as shown, the conical cutting edges 5 will cut under the lowermost pair of teeth E' in a path parallel to these teeth and will cut the inner side of the wall F perpendicularly or parallel to the other face of this wall at the outer side of the matrix body, and the recess G formed by the cutting teeth 4 will provide a clearance in which the core or portion of the tool carrying the cutting edges 6 may travel while these cutting edges are under-cutting or forming the lower sides of the lowermost pair of teeth, the angle of the cone on which the teeth 6 are formed conforming with the angle at which the axis of the tool is disposed during the cutting operation, to cut the under sides of the lowermost teeth at the proper angle. It will be understood, of course, that the cutting edges 4 of the tool may have different forms whereby the recess G may be made to extend more or less into the matrix body or remove more or less metal therefrom as desired.

I claim as my invention:—

1. The method of making a matrix for typographical machines, having a body with parallel edges and sides and a V-shaped web at the upper end of the body provided with oppositely disposed distributing teeth with flat undersides, which comprises cutting in a side of the matrix a recess having a conical base to simultaneously form by the walls of said base the flat undersides of the lowermost teeth and a wall perpendicular to the teeth, and to form by the sides of said recess a cavity with side walls angular to the edges and sides of the matrix and to the teeth in said web.

2. The method of making a matrix for typographical machines, having parallel sides and a V-shaped notch in its upper end provided with oppositely disposed distributing teeth having flat undersides, which comprises cutting in a side of the matrix below said notch a recess having a conical base the axis of which is oblique to such side of the matrix and the leading surface element of which forms a wall adjacent and parallel to the opposite side of the matrix, and simultaneously cutting through the clearance made in cutting said recess a communicating recess the walls of which are oppositely inclined and extend perpendicularly to the first mentioned wall and define the flat undersides of the lowermost teeth.

3. The method of making a matrix for typographical machines, having parallel sides and a V-shaped web in its upper end provided with oppositely disposed distributing teeth having flat undersides, which comprises opening into a side of the matrix adjacent to the apex of the web a recess with walls angular to the teeth and the sides of the matrix and a conical base one surface element of which is parallel to the matrix side, and the other surface element of which lies in a plane bisecting the matrix side and perpendicular thereto, and simultaneously opening the conical base along the surface element lying in said plane by cutting from said base in the direction of said element the flat undersides of the lowermost teeth.

4. The method of making a matrix for typographical machines, having a body with parallel sides and edges and a V-shaped web at the upper end provided with oppositely disposed distributing teeth having flat undersides, which comprises opening into a side of the matrix adjacent to the apex of the web a recess having side walls converging toward the base and angular to the sides and edges of the matrix and a conical base the axis of which is parallel to the edges but angular to the plane of the side of the matrix and the opposite surface elements of which, in a vertical plane through said axis, are parallel respectively to the sides of the matrix and the distributing teeth, and simultaneously cutting from the base of said recess in the direction of the latter surface element the flat undersides of the lowermost teeth.

5. The method of making a matrix for typographical machines, having parallel side faces and a V-shaped notch in its upper end provided with oppositely disposed distributing teeth having flat undersides, which comprises cutting in a side of the matrix below said notch a recess having a conical base the axis of which is oblique to the sides of the matrix and the surface elements of which in cutting said recess form oppositely inclined plane surfaces which extend perpendicularly to the sides of the matrix and thereby define the flat inclined undersides of the lowermost opposed teeth.

6. The method of making a matrix for typographical machines, having a V-shaped notch in its upper end the opposite walls of which notch are provided with oppositely disposed distributing teeth having flat undersides symmetrically inclined in opposite directions in relation to the respective walls of said notch, which comprises cutting in a side of the matrix below said notch, a recess the surface elements of which, in the cutting of said recess, form the flat undersides of the lowermost opposed teeth and a wall, one surface element only of which wall, in a plane bisecting the V-shaped notch is perpendicular to the length of said teeth.

7. The method of making a matrix for typographical machines, having a V-shaped notch in its upper end the opposite walls of which notch are provided with oppositely disposed distributing teeth having flat undersides symmetrically inclined in opposite directions in relation to the respective walls of said notch, which comprises cutting in a side of the matrix below said notch, a recess the surface elements of which, in the cutting of said recess, form the flat undersides of the lowermost opposed teeth and a wall at the base of the recess, one surface element of which wall coincides with the line of intersection of a plane bisecting the V-shaped notch and a plane perpendicular to said plane and to the surfaces of said teeth.

RANSOM H. TURNER.